Nov. 2, 1948.    W. A. SWENBERG    2,452,612
RELIEF VALVE ASSEMBLY FOR VENTILATION SYSTEM
Filed March 26, 1945
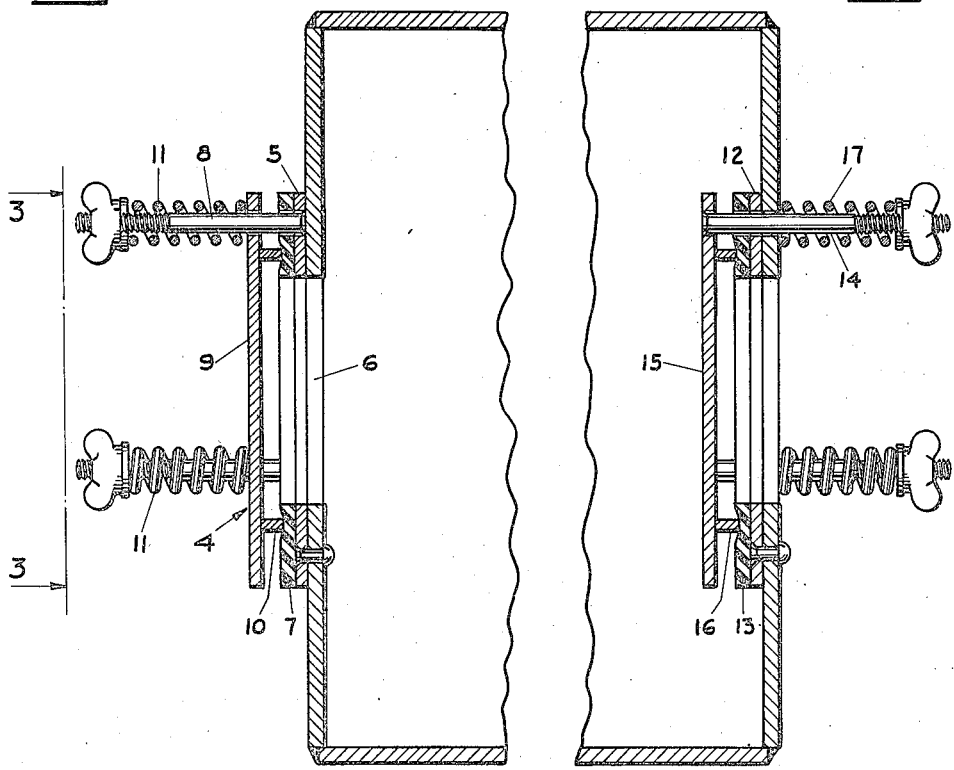
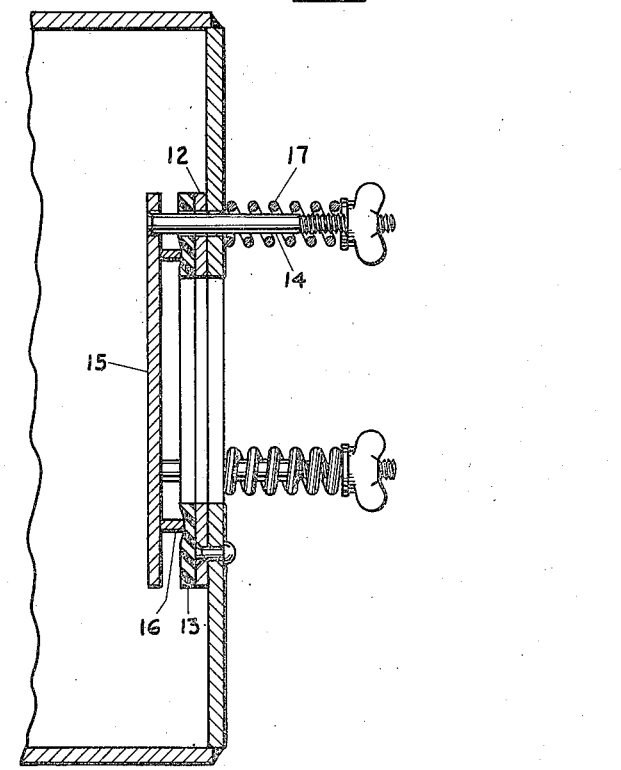
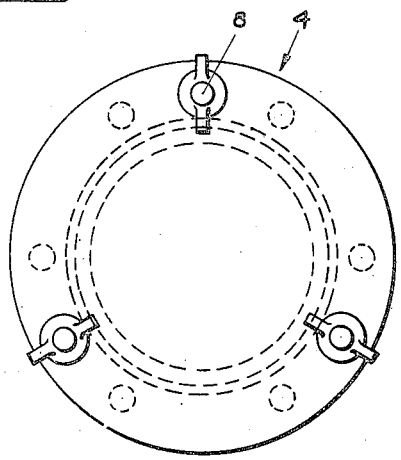
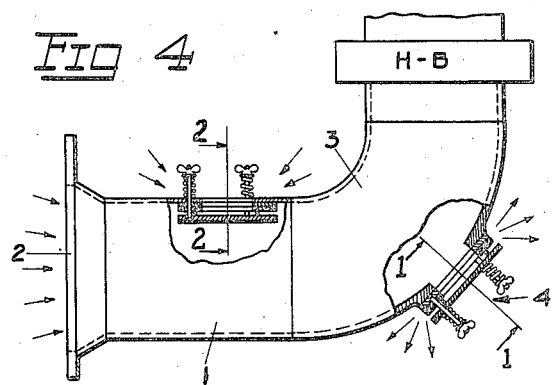
INVENTOR.
WALTER A. SWENBERG
BY
ATTORNEY.

Patented Nov. 2, 1948

2,452,612

UNITED STATES PATENT OFFICE 2,452,612

RELIEF VALVE ASSEMBLY FOR VENTILATION SYSTEM

Walter A. Swenberg, Long Beach, Calif.

Application March 26, 1945, Serial No. 584,993

2 Claims. (Cl. 277—61)

(Granted under the act of March 3, 1883, as amended April 30, 1928; 370 O. G. 757)

This invention relates to a relief valve and equalizer valve assembly for use in ventilation ducts particularly on board ship.

When large caliber guns are fired from a ship, they produce a heavy concussion wave. Oftentimes it is necessary to fire large caliber guns while the ventilation system of the ship is open. The concussion wave from the guns may enter the ventilation duct and often causes damage to the ventilation system at areas of weakness in the duct. Typical areas of weakness in the duct are places at which the duct makes an abrupt change of direction, or at the location in the system of heaters or fans, blowers and the like used to promote circulation of air through the system. I have devised an assembly and valve for preventing damage to ventilation systems caused by such concussion waves.

An object of the invention is to provide for preventing damage to ventilation systems on board ship due to the results of gun fire.

A further object of the invention is to provide an assembly of pressure relief and equalizing valves for use in ventilation ducts aboard ship.

A further object of the invention is to provide an assembly of pressure relief and equalizing valves which may be adjusted to operate at any desired pressure.

A further object of the invention is to provide an equalizing valve which will tend to prevent damage to ventilation systems due to shell hits in the vicinity of ventilation ducts.

The manner of accomplishing these and other objects of the invention is explained in the specification that follows and in the drawing, wherein:

Fig. 1 shows a cross sectional view of the pressure relief valve of my invention taken substantially on the line 1—1 of Fig. 4.

Fig. 2 shows a cross sectional view of the equalizing valve of my invention taken substantially on the line 2—2 of Fig. 4.

Fig. 3 shows a side elevational view of the pressure relief valve of my invention taken substantially on the line 3—3 of Fig. 1.

Fig. 4 is a top plan view partly broken away showing a ventilation duct with the system of valves of my invention installed therein.

Referring to the drawing:

1, Fig. 4, indicates a ventilation duct such as is commonly found on board ship in the ventilation system. Air is blown or drawn through the duct from the outside to ventilate the compartments of the ship. The air enters from the end 2 of the duct. Frequently in the design of the ventilation system, it is necessary to include in the duct various types of bends at which the air passing through the duct makes a rather abrupt change of direction. I have indicated such a bend at 3 in Fig. 4. The air passes on from the bend to some other part of the ship, sometimes through a heater or blower as generally indicated at H—B.

During ordinary ventilation of the ship, the pressure of the air is not sufficiently great to cause any damage to the duct at the bend, or elsewhere. The air passes through a portion of the duct prior to reaching the bend and impinges on the wall of the duct at the bend. The wall ordinarily has sufficient strength to divert the stream of air around the bend in a direction in which it is to travel to ventilate the ship.

When a large caliber gun is fired aboard the ship, a very heavy concussion wave is set up which may enter the ventilation duct. The force with which such a concussion wave may strike the wall of the duct at the bend may be greater than the rupturing point of the wall, particularly at the seams. Instead of being diverted around the bend, the concussion wave ruptures the wall of the duct at the bend. Such rupturing normally occurs at the seams in the vicinity of the bend.

It might be possible to overcome the rupturing of the duct by merely increasing the strength of the duct. However, if this is done, other parts of the ventilation system such as heaters and fans may be damaged. It has been found that it is more desirable to have the duct ruptured than to risk serious damage to heater and fans.

I find that damage by gun fire to ventilation systems may be overcome entirely or substantially reduced by use of a pressure relief valve at the point of bending of the duct. I have indicated such a valve at 4, Fig. 4. The valve 4 preferably comprises a seat ring 5, Fig. 1, secured to the duct by any appropriate means as by riveting as shown in the drawing or by welding. An opening 6 is provided in the duct within the ring 5. A resilient gasket 7 is secured to the outer face of the ring 5. A plurality of studs 8 are also secured to the ring. A valve plate 9 having openings adapted to register with the studs 8 is placed on the studs which pass through the openings. The valve plate 9 is provided with a sealing flange 10 that normally seats on the resilient gasket 7 to close the duct. Compression springs 11 are placed on the studs over the valve plate and are suitably held in place as by the wing nuts shown.

I find it desirable to include in the ventilation system a second valve which functions as an equalizing valve.

This valve is preferably located in a portion of the duct through which the air passes before it reaches the pressure relief valve. After a concussion wave has passed through the duct it is followed by a compression wave that acts on the exterior surfaces of the duct.

The equalizing valve is substantially similar in structure to the pressure relief valve but acts oppositely relative thereto. It comprises a seat ring 12 fixed to the interior surface of a wall of the duct, as by the rivets shown. A resilient gasket 13 is suitably secured to the ring 12. Studs 14 pass through aligned openings in the duct wall, ring seat and gasket and are connected with a valve plate 15 that has a sealing flange 16 engageable with the gasket 13 to normally maintain the duct in closed condition. Compression springs 17 and wing nuts as shown are provided for the studs 14. These elements are assembled in approximately the same manner as the elements of the pressure relief valve, except that the studs are secured to the valve disc and pass through openings in the wall of the duct in order that the wing nuts may be accessible exteriorly of the duct to tension the springs as desired.

Operation

The compression on the springs 11 and 17 is adjusted in such a manner that both valves remain closed during ordinary operation of the ventilation system, but the valves open when a concussion wave or a vacuum exists in the duct.

When a compression wave enters the duct, it strikes the valve plate 9 and causes it to open against the compressive force of the springs 11. After the wave has passed, the springs 11 force the valve closed to again seal the duct.

The compression wave is commonly followed by a vacuum. When there is a partial vacuum in the duct, atmospheric pressure against the valve plate 15 forces this valve open inwardly against the compressive force of the springs 17. Opening of the valve permits air to enter the duct from the surrounding atmosphere and to bring the pressure in the duct back to atmospheric pressure.

The equalizer valve 15 is also forced to open when an explosion occurs outside the duct in the vicinity thereof. This act of the valve 15 minimizes damage to ventilation ducts by shell hits or other explosions in the vicinity of the duct.

I have shown and described one embodiment of my invention. However, it will be apparent to those skilled in the art that the invention is subject to numerous modifications without departing from the spirit thereof. Therefore, I do not wish to be limited by the disclosure set forth hereinbefore, but only by the scope of the appended claims.

The invention described herein may be manufactured and used by or for the Government of the United States of America for governmental purposes without the payment of any royalties thereon or therefor.

I claim:

1. In combination, a ventilating duct open at one end to the atmosphere containing a bend, a pressure relief valve in the wall of said duct at the bend thereof comprising a seat ring, a resilient gasket on said seat ring, studs protruding from said seat ring, a valve plate movably engaged with said studs, yieldable means normally holding said valve plate against said gasket, an equalizer valve situated in the wall of a portion of the duct approaching the bend comprising a seat ring, a resilient gasket on said seat ring, a valve plate, studs protruding from the valve plate through said gasket seat ring and wall of the duct, and yieldable means normally holding the valve plate against the gasket.

2. In combination with a ventilating duct open at one end to the atmosphere containing a bend, a pressure relief valve in the wall of said duct at the bend thereof comprising a seat ring, a resilient gasket on said seat ring, studs protruding from said seat ring, a valve plate movably engaged with said studs, a sealing flange on the plate, yieldable means normally holding said valve plate sealing flange against said gasket, an equalizer valve situated in the wall of a portion of the duct approaching the bend comprising a seat ring, a resilient gasket on said seat ring, a valve plate, a sealing flange on the plate, studs protruding from the valve plate through said gasket seat ring and wall of the duct, and yieldable means normally holding the valve plate sealing flange against the gasket.

WALTER A. SWENBERG.

REFERENCES CITED

The following references are of record in the file of this patent:

UNITED STATES PATENTS

| Number | Name | Date |
| --- | --- | --- |
| 220,517 | Brandeis | Oct. 14, 1879 |
| 241,930 | Clayton | May 24, 1881 |
| 317,561 | Minnitt | May 12, 1885 |
| 943,426 | Lebenberg | Dec. 14, 1909 |
| 1,123,508 | Farrell | Jan. 5, 1915 |
| 1,179,129 | Maxam | Apr. 11, 1916 |
| 1,268,112 | Gerold | June 4, 1918 |
| 1,272,064 | Lezius | July 9, 1918 |
| 1,667,736 | Nelson | May 1, 1928 |
| 1,737,648 | Edsall | Dec. 3, 1929 |
| 1,856,492 | Marshall | May 3, 1932 |
| 1,897,076 | Shand | Feb. 14, 1933 |
| 2,297,892 | Jacobs | Oct. 6, 1942 |